Inventors:
Harry S. Blanchard;
Herman L. Finkbeiner,
by
Their Agent

United States Patent Office 3,219,626
Patented Nov. 23, 1965

3,219,626
PROCESS FOR OXIDIZING PHENOLS TO POLY-
PHENYL ETHERS AND DIPHENOQUINONES
Harry S. Blanchard, Schenectady, and Herman L. Fink-
beiner, Ballston Lake, N.Y., assignors to General Elec-
tric Company, a corporation of New York
Filed May 29, 1961, Ser. No. 113,364
10 Claims. (Cl. 260—47)

This invention relates to a method of utilization new compounds as catalysts in the oxidation of phenols. More specifically, this invention relates to the use of a cupric complex having the empirical formula

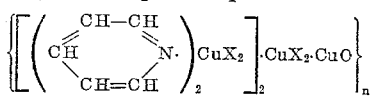

where X is selected from the group consisting of chlorine and bromine and $n$ is an integer and is at least 1, as catalysts for the oxidation of phenols, and more particularly to the oxidation of phenols to either phenylene oxide polymers or to diphenoquinones.

In an application, Serial No. 212,128, filed July 24, 1962, Hay which is a continuation-in-part of both Serial No. 69,245, Hay, filed November 15, 1960, now abandoned, and Serial No. 744,086, Hay, filed June 24, 1958, now abandoned, all of which are assigned to the same assignee as the present invention, there is disclosed and claimed a method of oxidizing phenols in which the catalysts is a tertiary amine and a cuprous salt soluble in the tertiary amine and capable of existing in the cupric state. Pyridine is one of the tertiary amines which may be used. Cuprous bromide or cuprous chloride are two of the cuprous salts which may be used. We have now found that the brown crystalline cupric complexes having the empirical formula

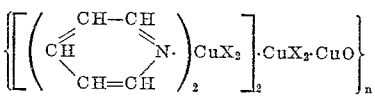

where X is selected from the group consisting of chlorine and bromine, and $n$ is an integrer and is at least 1, are extremely active catalysts for the oxidation of phenols, either to phenylene ether polymers, also known as polyphenylene ethers and polyphenylene oxides, or to diphenoquinones.

Figure 1:
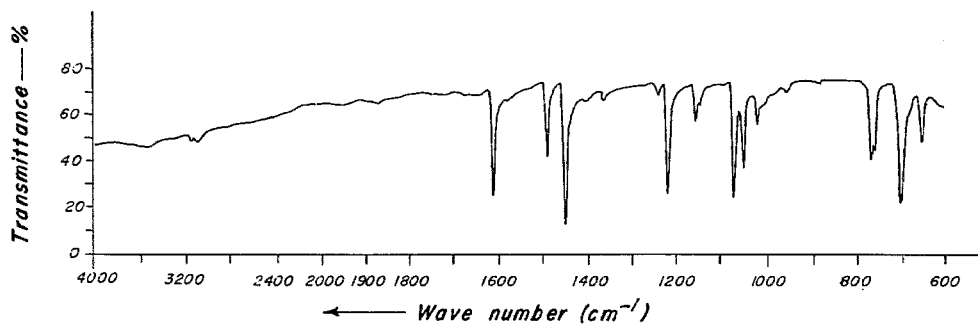
Figure 2:
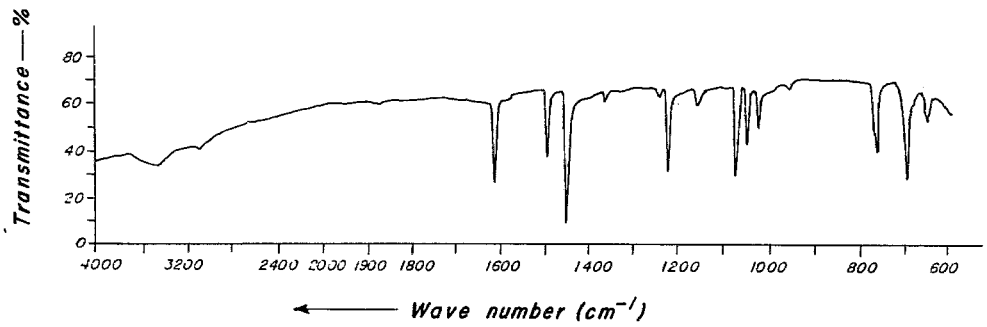

In order that those skilled in the art may better understand our invention, the following more detailed description is given, which should be read in conjunction with the attendant drawings, in which:

FIG. 1 is the infrared spectrum of our compound having the above empirical formula, wherein X is chlorine; and FIG. 2 is the infrared spectrum of our compound corresponding to the above empirical formula wherein X is bromine.

There are several alternative ways of producing the brown crystalline compounds of our invention. In a copending application of ours, Serial No. 425,995, filed December 22, 1964, as a division of our application Serial Number 113,363, filed concurrently herewith and assigned to the same assignee as the present invention, we have disclosed and claimed a green, crystalline cupric complex having the empirical formula

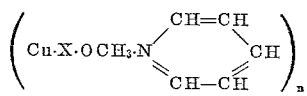

where X is selected from the group consisting of chlorine and bromine and $n$ is an integer and is at least 1. This green crystalline compound is readily prepared, for example, by reacting a cuprous salt selected from the group consisting of cuprous chloride and cuprous bromide dissolved in anhydrous methanol and reacted with oxygen in the presence of pyridine. The green crystalline cupric compound precipitates from the reaction mixture and is easily recovered by filtration. When this green crystalline compound is placed in methanol, it does not dissolve even when heated to the reflux temperature of the methanol. However, it does change from a green crystalline compound to the brown crystalline compound of this invention, which likewise is insoluble in methanol and can be easily isolated by filtration and dried in air.

The brown crystalline copper complex can be reconverted to the green crystalline copper complex by reaction of the former with an alkali metal alkoxide, e.g., sodium methylate, etc.

Another way to prepare our compound is to react oxygen with a solution of either cuprous chloride or cuprous bromide in isopropyl alcohol containing pyridine. This reaction can conveniently be carried out at ambient temperature up to the reflux temperature of the reaction mixture. The brown crystalline cupric ion complex precipitates from the reaction mixture from which it is conveniently filtered, washed and dried.

Our compound may also be prepared by making the pyridine complex of either cupric chloride or cupric bromide in which 2 moles of pyridine combine with 1 mole of the cupric halide. The complex is reacted with either cupric chloride or cupric bromide and with cupric hydroxide in the molar ratio of 2, 1 and 1, respectively. This gives a cupric complex in which the constituents are present in the ratio of 3 moles of cupric halide, 4 moles of pyridine and 1 mole of cupric hydroxide now present as the oxide. The reaction is carried out in a liquid which is inert to the reactants to facilitate heating. Suitable liquids are, for example, the liquid hydrocarbons, alcohols, ethers, etc. Specific examples are methyl alcohol, ethyl alcohol, dibutyl ether, petroleum ether, benzene, toluene, etc. The mixture is heated to reflux for approximately 5 to 10 minutes, by which time the desired brown crystalline compound which is insoluble has formed in the liquid phase. This is readily removed by filtration from the methanol and air dried. Another method is disclosed in Example 3.

When all of the halogen of the reactants is chlorine, the final product no matter which process is used, has the infrared spectrum shown in FIG. 1. When all of the halogen of the reactants is bromine, the final product no matter which process is used, has the infrared spectrum shown in FIG. 2. Table I shows the results obtained by elemental analysis of the compound containing chlorine, whose infrared spectrum is shown in FIG. 1.

TABLE I

| | Calculated for {[(C₅H₅N·)₂CuCl₂]₂·CuCl₂·CuO}ₙ | Found |
|---|---|---|
| C | 30.2 | 30.8 |
| H | 2.5 | 2.4 |
| N | 7.0 | 7.3 |
| Cu | 31.7 | 31.1 |
| Cl | 26.6 | 26.5 |
| O | 2.0 | 3.2 |

Such analysis confirms the empirical formula but does not define $n$. The numerical value to be assigned to $n$ can only be determined by determining the molecular weight. Unfortunately, such a determination depends on being able to dissolve the product in a solvent and so far we have been unable to find any solvent in which the brown crystalline complex is soluble, except under conditions whereby it reacts to form a new compound. Because of the well known ability of copper in the divalent state to form four coordinate complexes, we believe that our compounds have one of the structures (A) or (B):

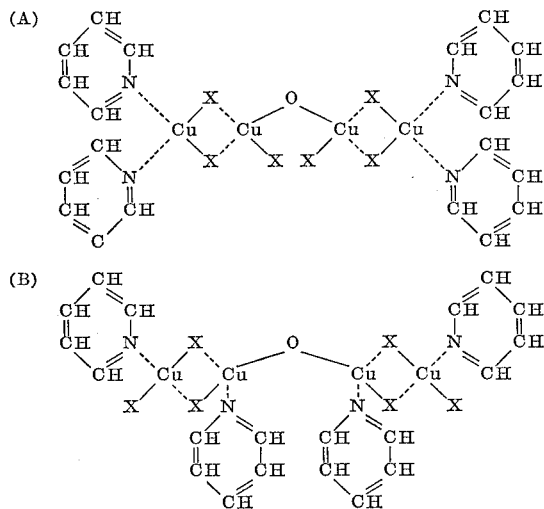

where in each case X is either chlorine or bromine. The fact that these compounds are crystalline indicates that the materials are of low molecular weight and therefore we believe that $n$ is most likely 1, but in any case probably does not exceed 6 or 8. These cupric complexes and their method of preparation are disclosed and claimed in our copending application, Serial No. 428,004, filed December 22, 1964 as a division of this application.

Surprisingly enough, these brown crystalline compounds cannot be prepared from such closely related materials as cupric iodide or cupric fluoride or alkyl substituted pyridines.

Our unique complexes may be used as catalysts for the oxidation of 2,6-disubstituted phenols for the preparation of either phenylene ether polymers or diphenoquinones according to the following schematic diagram:

(Equation I)

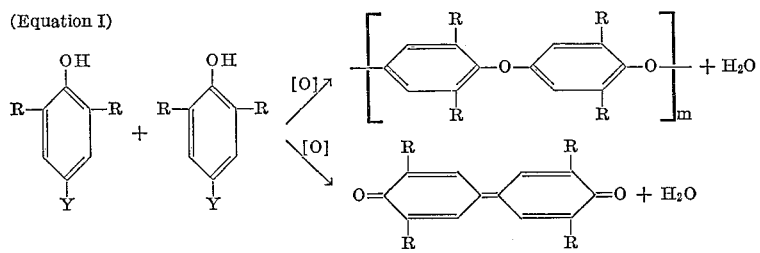

where $m$ is an integer having a value of at least 10, R is a monovalent substituent selected from the group consisting of hydrocarbon and halohydrocarbon having at least 2 carbon atoms and Y is a monovalent substituent selected from the group consisting of hydrogen, chlorine, bromine, and iodine.

It is to be understood that the reaction is not a direct oxidation as illustrated, but an oxidation involving participation of our unique copper complex catalysts in a self-condensation reaction between two or more molecules of the starting phenol.

The phenols which can be oxidized by our unique catalysts are represented by the formula shown in Equation I. Typical examples of such phenols are, by way of example, 2,6-dimethylphenol, 2,6-diethylphenol, the 2,6-dibutylphenols, 2,6-dilaurylphenol, the 2,6-dipropylphenols, 2,6 - diphenylphenol, the 2,6-di(chlorophenoxy)phenols, 2,6-di(chloroethyl)phenol, 2-methyl-6-isobutylphenol, 2-methyl - 6-phenylphenol, 2,6-dibenzylphenol, 2,6-ditolylphenol, 2,6 - di(chloropropyl)phenol, 2,6 - di - (2',4'-dichlorophenyl)phenol, 2,6 - dimethyl-4-chlorophenol, 2,6-dimethyl-4-bromophenol, 2,6-dimethyl-4-iodophenol, 2,6-diethyl - 4 - chlorophenol, the 2,6-dibutyl-4-bromophenols, 2,6-dilauryl-4-iodophenols, the 2,6-dipropylchlorophenols, 2,6-diphenyl-4-bromophenol, the 2,6-di(chlorophenoxy)-4-chlorophenols, 2,6-di(chloroethyl)-4-bromophenol, 2-methyl - 4-bromo-6-isobutylphenol, 2-methyl-4-chloro-6-phenylphenol, 2,6 - dibenzyl - 4-iodophenol, 2,6-ditolyl-4-chlorophenol, 2,6-di(chloropropyl)-4-chlorophenol, etc.

The preference of the oxidation reaction to involve the para position is so pronounced that even though this position is substituted with a halogen other than fluorine, the halogen will be removed even though the meta positions are unsubstituted. In such a case, the halogen atom reacts with and inactivates one molecule of copper catalyst. Therefore, it is necessary to use one mole of catalyst for each atom of halogen removed unless, as we have found, one mole of free base is present for each atom of halogen which will be removed, in which case only a catalytic amount of our unique catalyst needs to be used as is true when hydrogen occupies the para position, e.g., in the order of 0.1 to 10 mole percent based on the moles of phenol to be oxidized. Examples of suitable bases which may be used are the alkali metal hydroxides, alkali metal alkoxides, tetraalkyl ammonium alkoxides, tetraalkyl ammonium hydroxides, etc., specific examples of which are sodium hydroxide, potassium hydroxide, cesium hydroxide, lithium hydroxide, sodium methylate( sodium methoxide), potassium ethoxide, lithium propoxide, tetramethyl ammonium hydroxide, tetraethyl ammonium methoxide, etc. In this reaction the products are polyphenylene ethers.

Halomethyl groups in the two ortho positions are so hydrolytically reactive that they produce undesirable by-products in the oxidation reaction. Therefore, we prefer to exclude such phenols from such oxidation reaction mixtures as the principal reactant, although they may be present in small quantities as modifiers. Other ring substituents such as nitro, cyano, carboxyl, formyl, etc., which are reactive with amines or copper salts should also be excluded as substituents of the phenols used as the principal reactants, although phenols containing these groups can be used in minor amounts as modifiers of the polymer.

The general method of oxidzing phenols using our unique catalysts is to pass oxygen or an oxygen-containing gas through a mixture of one or more 2,6-disubstituted monohydric, monocyclic phenols as the starting material in the presence of our brown crystalline cupric complex. In this case, the product is always the diphenoquinone corresponding to the starting phenol. However, if an amine, and preferably a tertiary amine, is present in addition to that added as a constituent of the brown crystalline cupric complex catalyst, the product nominally is the polyphenylene ethers except as noted below. Primary and secondary amines, but not tertiary amines, react and become part of the product molecule. We, therefore, prefer to use tertiary amines when preparing polyphenylene ethers and specifically to use pyridine.

When the substituents in the 2- or 6-position have a three-dimensional structure approaching that of a sphere they limit the oxidation reaction of the phenols to the formation of diphenoquinones. When such a substituent is a radical having an α-tertiary carbon atom, e.g., tertiary butyl and tertiary amyl, etc., it is so bulky that the presence of only one such radical in the 2- or 6-position will prevent the formation of the polyarylene ethers. Bulky groups such as isopropyl appear to be borderline in that in a normal oxidation reaction, they will produce both the diphenoquinone and the polyphenylene ether, with the latter predominating, when there is only one isopropyl substituent and the former predominating, when there are two such substituents. When aryl substituents occupy both the 2- and the 6-position, diphenoquinones are also produced exclusively. Otherwise, when the two substituents in the 2,6-position are hydrocarbon or halohydrocarbon radicals having at least 2 carbon atoms, the products are the polyphenylene ethers, if a tertiary amine is present, unless the water of reaction is removed as fast as it is formed, in which case again the diphenoquinones are the main product.

Any of the well known tertiary amines may be used in conjunction with our brown crystalline copper complex catalyst when it is desired to prepare polyphenylene ethers. Examples are the aliphatic tertiary amines, such as trimethylamine, triethylamine, tripropylamine, tributylamine, trisecondary propylamine, diethylmethylamine, dimethylpropylamine, allyldiethylamine, dimethyl-n-butylamine, diethylisopropylamine, benzyldimethylamine, dioctylbenzylamine, dioctylchlorobenzylamine, dimethylcyclohexylamine, dimethylphenethylamine, benzylmethylethylamine, di(chlorophenethyl)bromobenzylamine, 1-dimethylamino-2-phenylpropane, 1-dimethylamino-4-pentane, etc. When aliphatic tertiary amines are used, we prefer that at least two of the aliphatic groups be straight chain hydrocarbon groups.

In general, tertiary polyamines would behave in the same way as tertiary monoamines in our reaction, except of course, the amount used would only have to be that amount necessary to give the equivalent amount of amino groups. Typical examples of aliphatic tertiary polyamines are the N,N,N',N'-tetraalkylethylenediamines, the N,N,N',N'-tetraalkylpropanediamines, the N,N,N',N'-tetraalkylbutanediamines, the N,N,N',N'-tetraalkylpentanediamines, the N,N',N',N'',N''-pentaalkyldiethylenetriamines, etc. Likewise, the polyamines may be mixed tertiary aliphatic and tertiary aromatic amines, e.g., piperidinoalkylpyridines, dialkylaminoalkylpyridines, morpholinoalkylpyridines, N,N,N',N'-tetramethylethylenediamine, N-ethyl-N,N',N'-trimethylethylenediamine, N-methyl-N,N',N'-triethylethylenediamine, N,N,N',N'-tetramethyl-1,3-propanediamine, N,N,N',N'-tetraethylethylenediamine, N,N-dimethyl-N',N'-diethylethylenediamine, 1,2-bis(2-methylpiperidino)ethane, N,N,N',N'-tetra-n-hexylethylenediamine, N,N,N',N'-tetra-n-amylethylenediamine, 1,2-bispiperidinoethane, N,N,N',N'-tetraisobutylethylenediamine, N,N,N',N'-tetramethyl-1,3-butanediamine, 1,2-bis(2,6-dimethylpiperidino)ethane, N,N-didecyl-N',N'-dimethylethylenediamine, N-methyl, N',N',N'', N''-tetraethyldiethylenetriamine, N-decyl-N,N',N'-triethylethylenediamine, 2-(β-piperidinoethyl)pyridine, 2-(β-dimethylaminoethyl)-6-methylpyridine, 2-(β-dimethylaminoethyl)pyridine, and 2-(β-morpholinoethyl)pyridine, etc.

Examples of cyclic amines are the pyridines, such as pyridine itself, quinuclidine, the dipyridyls, the N-alkyl pyrroles, the N-alkyl pyrrolidines, the N-alkyl piperidines, the N-alkyl diazoles, the N-alkyl triazoles, the diazines, the triazines, the quinolines, the diquinoyls, the isoquinolines, the N-alkyl tetrahydroquinolines, the N-alkyl tetrahydroisoquinolines, the phenanthrolines, the N-alkyl morpholines, etc., including the ring-substituted products of these cyclic amines whereby one or more of the hydrogen atoms on the carbons forming the ring are substituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that when piperidines, pyrroles, pyrrolidines, diazoles, tetrahydroquinolines, tetrahydroisoquinolines, etc., are used they are tertiary amines whereby an alkyl hydrocarbon radical, such as those listed above for the ring substituents, is also attached to the amine nitrogen group, e.g., N-methylpyrrole, N-methyl tetrahydroquinoline, N-methyl tetrahydroisoquinoline, N-methyl piperidine, N-methyl pyrrolidine, N-methylimidazole, N-methyl-1,2,4-triazole, N-decylpiperidine, N-decylpyrrolidine, N-isobutylpiperidine, 1-decyl-2-methylpiperidine, N-isopropylpyrrolidine, N-cyclohexylpiperidine, etc.

In carrying out the oxidation, the phenol is usually dissolved in a solvent which may be pyridine, alcohols, ketones, hydrocarbons, chlorohydrocarbons, nitrohydrocarbons, ethers, esters, amides, mixed ether esters, sulfoxides, etc., the only requirement being that they do not interfere or enter into the oxidation reaction. Oxygen or an oxygen-containing gas is bubbled into the reaction mixture in the presence of our preformed brown crystalline cupric complex. It is believed that our catalyst enters into reaction with the phenol in some manner, and goes into solution with the oxygen or oxygen-containing gas, which is bubbled into the reaction mixture, regenerating the catalyst which then reacts with more phenol. If the polyphenylene ether resins are the desired product, it is preferable to prevent the escape of the water formed by the reaction of oxygen from the reaction vessel or at least to control the escape of water so that there is always one mole of water present for each mole of copper catalyst. However, if diphenoquinones are the desired product and the structure of the starting phenol would nominally produce the polyphenylene ether if a tertiary amine were present, as explained above, then diphenoquinones can still be obtained, in spite of the presence of the tertiary amine, but provisions must be made for the removal of the water of reaction as fast as it is formed. This can be done for example by sweeping with an inert gas, by carrying out the reaction at subatmospheric pressure, by azeotropic distillation, or by the use of open reaction vessels, by heat, or any combination thereof. In carrying out the reaction, oxygen can be used alone or it can be diluted with an inert gas such as nitrogen, helium, argon, etc., or air itself can be used.

Since the reaction is usually exothermic, the reaction can become overheated resulting in the formation of undesirable products. Generally, the oxidation reaction should be initiated at as low a temperature as the reaction will start, as evidenced by the reaction becoming exothermic. It is preferable to control the oxidation reaction so that the maximum temperature does not exceed 100° C., and preferably does not exceed 80° C. The heat of reaction may be removed, for example, by radiation convection, or by cooling coils which can be either immersed in or surround the reaction vessel.

Generally, the passage of oxygen into the reaction mixture is continued until no more heat is generated, or the desired amount of oxygen is absorbed. Alternatively, the same or different phenol may be continuously added during the oxidation reaction to produce mixed products.

To terminate the reaction, the catalyst system is destroyed by the addition of an acid preferably a mineral acid such as hydrochloric or sulfuric acid, or the product may be removed from the presence of the catalyst, either by filtering off the product if it has precipitated, or by pouring the reaction mixture into a material which is a solvent for the catalyst system but a non-solvent for the product. Alternatively, copper may be precipitated as an insoluble compound and filtered from the solution. After the product is precipitated, it may be dissolved and reprecipitated any desirable number of times to remove impurites. Finally, it is filtered and washed free of any remaining contaminants.

Modifiers of the reaction may be added to the reaction mixture to yield products which have improved properties over the products prepared in the absence of modifiers. Such modifiers are anion exchange resins, nitroaromatics such as mono-, di- and trinitrobenzenes, mono-, di-, and trinitrophenols, etc., peroxide deactivators such as heavy metals and their oxides, adsorbants such as activated charcoal, silica gel, aluminum, etc.

In order that those skilled in the art may better understand our invention, the following examples are given which are illustrative of the practice of our invention and are not intended for purposes of limitation. In the examples, all parts are by weight, unless stated otherwise. Examples 1–5 illustrate several methods for the production of the cupric complex disclosed and claimed in our above-referenced copending application which is a division of this application.

*Example 1*

The green crystalline, insoluble, cupric chloride pyridine complex was prepared according to the method disclosed and claimed in our above-referenced copending application, which is a division of our copending application, Serial Number 113,363, for example, by stirring a reaction mixture containing 0.5 gram of cuprous chloride, 2 ml. of anhydrous pyridine, and 50 ml. anhydrous methanol in an atmosphere of oxygen for 16 hours, and filtering the green crystalline solid which precipitates from the reaction mixture. This compound was refluxed in methanol under nitrogen for 120 minutes, by which time the green crystalline compound which had never dissolved in the methanol was converted to the brown crystalline compound whose elemental analysis is shown in Table I, and whose infrared spectrum is shown in FIG. 1. The structural formula of this compound is believed to be illustrated by structures A or B, in which X is chlorine. Our brown crystalline compound was likewise produced by reacting a suspension of 1 gram (0.00239 mole) of the above green crystalline cupric complex in 25 ml. of 0.1 N (0.0025 mole of HCl) solution of hydrogen chloride in methanol. Within one to two minutes the green mixture turned tan and within 10 to 15 minutes the desired brown crystalline cupric complex had formed. After filtering from the reaction mixture, washing with methanol and air drying the material was found to have an infrared spectrum identical with that shown in FIG. 1.

*Example 2*

The brown crystalline copper complex prepared in Example 1 may be reconverted back to the green crystalline copper complex starting material as follows: 0.8 gram (0.001 mole) of the brown crystalline compound identical with that prepared in Example 1 was added to 25 ml. of methanol, along with 1 ml. of a 2 N (0.002 mole) of sodium methylate in methanol, and stirred for 1 hour at room temperature. During this time, the crystalline compound which did not dissolve became a green crystalline compound which was filtered from the reaction mixture and dried in air. Infrared analysis of this material showed it to be almost completely the green crystalline cupric complex used as the starting material in Example 1.

*Example 3*

A solution of 0.5 gram (0.0037 mole) of cupric chloride in 40 ml. of methanol was prepared under nitrogen and 0.370 gram (0.0037 mole) of cuprous chloride, followed by 0.6 ml. (0.0074 mole) of pyridine, were added. As soon as the pyridine was added, a purple solid precipitated from the reaction mixture and was believed to have the structural formula of either of the two alternatives shown below.

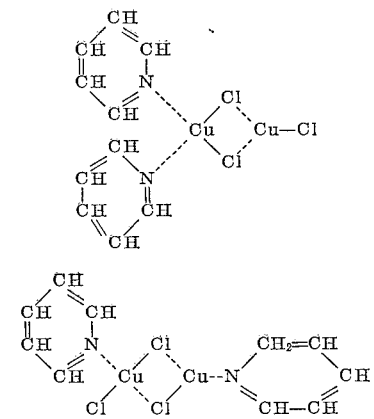

Oxygen was now bubbled through the reaction mixture which immediately turned the mixture green and a brown crystalline compound separated which after separation from the reaction mixture was found to have an infrared spectrum identical with that in FIG. 1.

As will be readily apparent to those skilled in the art, either the cupric chloride or the cuprous chloride in the above reaction may be replaced with the corresponding bromide so that the brown crystalline compound isolated from the reaction mixture would be a mixed chloride-bromide compound.

*Example 4*

The pyridine complex of cupric chloride was prepared by reacting 10 grams (0.126 mole) of pyridine with a solution of 6.75 grams (0.05 mole) of cupric chloride in 300 ml. of methanol at room temperature. The complex which precipitated was filtered from the solution and dried. A suspension of 2.92 grams (0.01 mole) of the pyridine cupric chloride complex, 0.67 gram (0.005 mole) of cupric chloride and 0.5 gram (0.005 mole) of cupric hydroxide in about 60 ml. of methanol was refluxed for approximately 10 minutes by which time the solids had become a brown crystalline material. After separation from the reaction mixture and drying, the material was found to have an infrared spectrum identical with FIG. 1.

*Example 5*

The pyridine complex of cupric bromide was prepared by reacting 10 grams (0.126 mole) of pyridine with a solution of 11.2 grams (0.05 mole) of cupric bromide in 300 ml. of methanol at room temperature. The complex which precipitated was collected by filtration and dried.

A suspension of 3.8 grams (0.01 mole) of the pyridine-cupric bromide complex, 1.1 grams (0.005 mole) of cupric bromide and 0.5 gram (0.005 mole) of cupric hydroxide in 60 ml. of methanol was refluxed for approximately 10 minutes by which time the solids had become a reddish-brown crystalline material. After separation from the reaction mixture and drying, the material was found to have an infrared spectrum identical with FIG. 2.

*Example 6*

A solution of 0.732 gram (0.006 mole) of 2,6-xylenol in 31 ml. of benzene containing 9 ml. of pyridine and 0.2 gram of the brown crystalline compound prepared in Example 4, was placed in a reaction vessel in a closed system equipped to measure oxygen absorption. The reaction vessel was immersed in a water bath and heated to 30° C. In a period of 28 minutes, 72.5 ml. of oxygen (theoretical 73.4 ml.) was absorbed by the reaction mixture. When poured into 160 ml. of methanol containing 2 ml. of concentrated hydrochloric acid, 0.70 gram of a polymer was precipitated. This polymer had an intrinsic viscosity of 0.96 measured at 25° C. in a chloroform solution. The infrared analysis of the polymer proved to be the poly-2,6-dimethylphenylene ether of the type disclosed in the above-identified Hay application.

*Example 7*

A solution of 0.635 gram (0.0052 mole) of 2,6-xylenol in about 40 ml. of benzene containing 0.10 ml. of pyridine and 0.20 milligram of the brown crystalline compound identical with that prepared in Example 4 was reacted with oxygen in the apparatus described in Example 4. During a period of 308 minutes, it absorbed 54.1 ml. of oxygen compared to the theoretical amount of 63.5 ml. The reaction was allowed to continue for 20 hours, by which time it absorbed over the theoretical amount of oxygen and precipitated 0.1 gram of a red solid which was filtered off and washed with water and acetone. Infrared analysis showed this to be 3,3′,5,5′-tetramethyldiphenoquinone. The solution was poured into 160 ml. of methanol containing 2 ml. of concentrated hydrochloric acid, 0.4 gram of polymer was obtained which was determined by infrared analysis to be identical with the polymer obtained in Example 4.

*Example 8*

A solution of 2 grams (0.01 mole) of 4-bromo-2,6-dimethylphenol in 20 ml. of benzene containing 5 ml. of 2.26 M (0.011 mole) benzyltrimethyl ammonium methoxide in methanol was stirred magnetically under nitrogen and 0.40 gram (0.0005 mole) of a brown crystalline compound identical with that prepared in Example 4 was added. After a few minutes of reaction, the reaction mixture was precipitated by pouring into 100 ml. of methanol containing 8 ml. of concentrated hydrochloric acid. After filtering and washing with methanol, 1.15 grams of a white polymer was recovered which had an intrinsic viscosity of 0.65 measured at 25° C. in a chloroform solution. Infrared analysis showed that this polymer was poly-2,6-dimethylphenylene ether.

In order to obtain optimum yield of polymer in this reaction, there should be essentially 1 mole of base present for each mole of bromine to be removed. However, when Example 8 was repeated using only 0.009 mole of benzotrimethyl ammonium methoxide, the results were the same as in Example 8, where 0.011 mole of the base was used. However, when Example 8 was repeated using 0.014 mole of the benzotrimethyl ammonium methoxide in methanol, the yield of polymer was decreased to 0.12 gram.

*Example 9*

A solution of 0.732 gram of 2,6-xylenol in 40 ml. of benzene containing 0.200 gram of the brown crystalline compound prepared in Example 4, was placed in a reaction vessel in a closed system equipped to measure oxygen absorption. The reaction vessel was immersed in a water bath and heated to 50° C. In 20 hours the mixture absorbed 80 ml. oxygen (theoretical 73.4 measured at 29° C.) and 0.42 gram of 3,5,3′,5′-tetra-methyldiphenoquinone was isolated by filtration. The material was identified by its infrared spectrum. Precipitation of the mother liquors into methanol containing hydrochloric acid yielded 0.03 gram of polymer identified as poly-2,6-dimethylphenylene ether by its infrared spectrum.

*Example 10*

A solution of 0.732 gram (0.006 mole) of 2,6-xylenol in 31 ml. of benzene containing 9 ml. of pyridine and 0.267 gram of the reddish brown crystalline complex prepared in Example 5, was placed in a reaction vessel in a closed system equipped to measure oxygen absorption. The reaction vessel was immersed in a water bath and heated to 30° C. In a period of 180 minutes, 70.4 ml. of oxygen (theoretical 73.4 ml.) was absorbed by the reaction mixture. When poured into 160 ml. of methanol containing 2 ml. of concentrated acid, 0.62 gram of a polymer was precipitated. This polymer had an intrinsic viscosity of 1.78 measured at 25° C. in chloroform solution. The infrared spectrum of the polymer proved it to be the poly-2,6-dimethylphenylene ether of the type disclosed in the above-identified Hay application.

Because of their excellent mechanical, chemical, electrical and thermal properties, the polymers obtained by use of our catalysts have many and varied uses. For example, they can be used in molding powder formulations, either alone or mixed with various fillers, such as wood flour, diatomaceous earth, carbon black, silica, etc., to make molded parts, such as spur, helical, worm or bevel gears, ratchets, bearings, cams, impact parts, gaskets, valve seats for high pressure oil and gas systems or other chemical fluids requiring resistance to chemicals, etc. They may be mixed with abrasives, such as garnet, silicon carbide, diamond bort, etc., to make abrasive discs, paper, etc. They can be used to prepare molded, calendered, or extruded articles, films, coatings, threads, filaments, tapes and the like. They can be applied to a broad spectrum of uses in the form of sheets, rods, tapes, etc., and are useful in electrical applications, such as in cable terminals, terminal blocks, backing for electrical circuits, as components of dynamoelectric machines that operate at high temperatures, etc. Films of these materials can be prepared by suitable means, such as by dissolving or suspending them in a suitable solvent, followed by spreading on a surface from which the polymer is removed after evaporation of the solvent, by calendering or extrusion, etc. These films (either oriented or not) are useful as metal or fiber liners, containers, covers, closures, electrical insulating tapes, as sound recording tapes, pipe and wire tapes, etc. As a coating material they can be applied as a solution or suspension to any convenient foundation where a surface possessing their excellent properties is desired. They can be used as an encapsulation material, for electrical insulation, for example, as a wire enamel, potting compound, etc. They can be extruded from melt, solution or suspension into a precipitating solvent or evaporating medium, etc. The fibers so produced (oriented or not) can be woven into fabrics, useful in many applications, for example, as filter cloths where high chemical and heat resistance is desired. Their excellent electrical properties make laminates of this material useful for electrical equipment, such as slot wedges in the armature of an electric motor, panel boards for printed circuits, electrical appliance panels, radio and television panels, small punched electrical pieces, transformer terminal boards, transformer coil spacers, etc. The polymers may also be mixed with various fillers, modifying agents, etc., such as dyes, pigments, stabilizers, plasticizers, etc.

The non-polymeric products exhibit the same utility as the same compounds prepared by any other method. Thus, the quinones and diphenoquinones can be used as dyes, etc., and in the reduced form as antioxidants. In addition, these compounds can be used as chemical intermediates in the preparation of other materials, such as polymers. For example, the diphenoquinones can be reduced to dihydroxy compounds of the bis-phenol type which are useful in preparing epoxide, polyester, polycarbonate, etc., resins.

Obviously, other modifications and variations of the present invention are possible in the light of the above teachings. It is, therefore, to be understood that changes may be made in the particular embodiments of the invention described which are within the full intended scope of the invention as defined by the appended claims.

What we claim as new and desire to secure by Letters Patent of the United States is:

1. The process of producing self-condensation products of phenols selected from the group consisting of polyphenylene ethers and diphenoquinones which comprises reacting oxygen in the presence of a cupric complex having the empirical formula

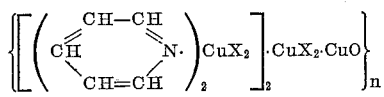

where X is selected from the group consisting of chlorine and bromine and $n$ is an integer and is at least 1, with a phenol having the structural formula

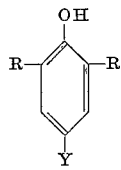

where each R is a monovalent substituent selected from the group consisting of hydrocarbon radicals, halohydrocarbon radicals having at least two carbon atoms, hydrocarbonoxy radicals and halohydrocarbonoxy radicals having at least two carbon atoms with the proviso that, when polyphenylene ethers are the desired product, no more than one R is aryl and each R is free of a tertiary α-carbon atom, and Y is a monovalent radical selected from the group consisting of hydrogen, chlorine, bromine and iodine, with the proviso that when Y is one of the named halogens the reaction is carried out in the presence of at least one equivalent of free base for each atom of halogen present in the phenol and when Y is hydrogen and the desired products are polyphenylene ethers, a tertiary amine is present in the reaction mixture.

2. The process of claim 1 wherein each R is a hydrocarbon radical and Y is hydrogen.

3. The process of claim 1 wherein each R is alkyl and Y is hydrogen.

4. The process of claim 1 wherein each R is methyl and Y is hydrogen.

5. The process of producing self-condensation products of phenols selected from the group consisting of polyphenylene ethers and diphenoquinones which comprises reacting oxygen with 2,6-dimethylphenol in the presence of a cupric complex having the empirical formula

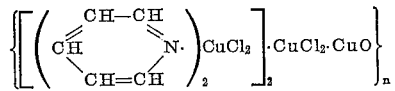

where $n$ is an integer and is at least 1, with the proviso that when polyphenylene ethers are the desired products, a tertiary amine is present in the reaction mixture.

6. The process of preparing polyphenylene ethers which comprises reacting oxygen with 2,6-dimethyl-4-bromophenol in the presence of essentially 1 mole of free base for each mole of bromine present in the phenol and in the presence of a cupric complex having the empirical formula

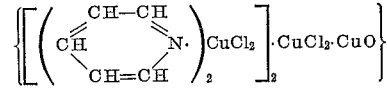

where $n$ is an integer and is at least 1.

7. The process of oxidizing phenols to diphenoquinones which comprises reacting oxygen in the presence of a cupric complex having the empirical formula

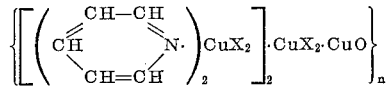

where X is selected from the group consisting of chlorine and bromine and $n$ is an integer and is at least 1, with a phenol having the structural formula

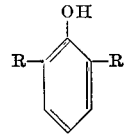

where each R is a monovalent hydrocarbon radical, said reaction being carried out in the absence of any amine other than that present in said cupric complex.

8. The process of oxidizing phenols to diphenoquinones which comprises reacting oxygen in the presence of a cupric complex having the empirical formula

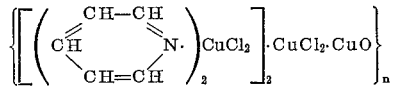

where $n$ is an integer and is at least 1, with a phenol having the structural formula

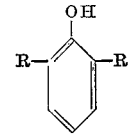

where each R is a monovalent hydrocarbon radical, said reaction being carried out in the absence of any amine other than that present in said cupric complex.

9. The process of claim 8 wherein each R is an alkyl radical.

10. The process of claim 8 wherein each R is methyl.

References Cited by the Examiner

UNITED STATES PATENTS

| | | | |
|---|---|---|---|
| 2,686,814 | 8/1954 | Jones | 260—396 |
| 2,767,187 | 10/1956 | Shrader et al. | 260—270 |
| 2,785,188 | 3/1957 | Coe | 260—396 |
| 2,827,463 | 3/1958 | Schaeffer | 260—270 |
| 2,856,414 | 10/1958 | Robeson et al. | 260—396 |
| 2,911,387 | 11/1959 | Vandenberg | 260—47 |
| 2,915,501 | 12/1959 | Guest et al. | 260—47 |
| 2,940,988 | 6/1960 | Coppinger | 260—396 |

FOREIGN PATENTS

| | | |
|---|---|---|
| 1,022,376 | 1/1958 | Germany. |
| 568,818 | 4/1945 | Great Britain. |

OTHER REFERENCES

Brackman et al.: Recueil des Travaux Chimiques, vol. 74, pages 937–55, 1021–39 (1955).

Hay et al.: J. Am. Chem. Soc., vol. 81, pp. 6335–6 (1959).

Terent'ev et al.: Chem. Abstracts, vol. 50, page 4807e (1956).

LORRAINE A. WEINBERGER, *Primary Examiner.*

IRVING MARCUS, DUVAL McCLUTCHEN, LEON ZITVER, *Examiners.*